No. 737,672. PATENTED SEPT. 1, 1903.
J. E. STATE.
SAFETY MATCH.
APPLICATION FILED FEB. 24, 1903.
NO MODEL.
*Fig. I.*
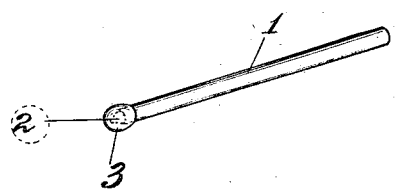
*Fig. II.*
*Fig. III.*
*Fig. IV.*
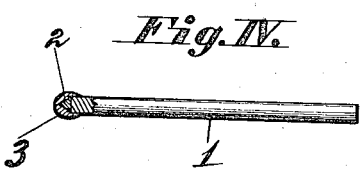
Attest:
Edw. L. Dillon
Julia B. McGown
Inventor:
Joseph E. State,
by Carr&Carr,
Att'ys.

No. 737,672. Patented September 1, 1903.

UNITED STATES PATENT OFFICE.

JOSEPH E. STATE, OF EAST ST. LOUIS, ILLINOIS.

SAFETY-MATCH.

SPECIFICATION forming part of Letters Patent No. 737,672, dated September 1, 1903.

Application filed February 24, 1903. Serial No. 144,628. (No model.)

*To all whom it may concern:*

Be it known that I, JOSEPH E. STATE, a citizen of the United States, and a resident of the city of East St. Louis, county of St. Clair, and State of Illinois, have invented a certain new and useful Safety-Match, of which the following is a specification.

The principal object of my invention is to avoid the accidental ignition of matches by frictional contact with ordinary objects except by applying such friction at a certain point.

My invention consists in the construction hereinafter described and claimed.

In the accompanying drawings, which form part of this specification, and wherein like symbols refer to like parts wherever they occur, Figure 1 is a perspective view of my invention, showing the outer composition in full lines and the inner composition in dotted lines on the end of the match-stem. Fig. 2 is a view of a match-stem, with the inner composition applied thereto. Fig. 3 is a modification of the form shown in Fig. 2; and Fig. 4 is a longitudinal section of the completed match, as shown in Fig. 1.

A match stem or stick 1 is provided at one end with a friction igniting substance or composition 2, which is substantially within the extended periphery of the stem. After the end of the stem has been dipped in melted stearic acid the friction igniting substance is applied thereto in any way that will practically prevent its spreading beyond the end edges of the stem. As the substance is applied in a fluid or semifluid condition, it is liable to spread beyond the end edges of the stem; but although such spreading becomes detrimental as soon as it overlaps the side surface of the stem the overlapping of an inappreciable quantity may be disregarded. While the substance may be applied by hand, it is preferable to apply it by some suitable apparatus or machine. By "friction igniting substance" is meant a substance which will ignite by the application of friction thereto. The substance may be the ordinary composition used on parlor-matches, which ignites by friction; but a preferable composition consists of yellow phosphorus, one part; powdered glass, three parts; powdered chlorate of potassium, two parts; black oxid of manganese, one part, and a warm solution of glue of such quantity and consistency that when cool it will assume a fairly solid condition. The yellow phosphorus is added to the solution of glue, which should be warm enough to melt the phosphorus. The powdered glass is then added, and the mixture is emulsified by trituration. The powdered chlorate of potassium and black oxid of manganese are then added, and the whole is thoroughly mixed. The composition is applied while warm, and it may be in a more or less fluid condition, depending upon the quantity and consistency of the solution of glue. If this mass is rather thick when it is applied to the match-stem, it will assume a rather pointed appearance, as shown in Fig. 2. If it is more fluid, then it will assume a more rounded form, as shown in Fig. 3. This friction igniting substance should be slightly dried before the non-friction igniting substance hereinafter described is applied thereto.

Surrounding the friction igniting substance 2 is a cover or coating of a suitable non-friction igniting substance 3—that is, a substance which will not ignite by frictional contact with ordinary objects. This protective coating preferably covers the whole mass of the friction igniting substance and also the endmost portions of the sides of the stem. By reason of the protective coating overlapping the end of the stem, said coating adheres directly to the sides of the stem; but so long as the sides of said mass are properly coated the endmost projecting portion of the friction igniting substance may remain uncovered. By the word "surrounding" as herein used is meant covering wholly or in part. The non-friction igniting substance may be the composition ordinarily used for safety-matches; but it is preferable to use the following: Golden sulfid of antimony, six parts; chlorate of potassium, sixteen parts; powdered glass, two parts; a warm solution of glue of sufficient amount and consistency to make of the whole a pasty mass; but preferably it is not as thick as the friction igniting paste or composition 2. This non-friction igniting substance may be applied in the same way as the friction igniting substance. After the non-friction igniting substance is applied the whole is allowed to thoroughly dry. As the non-friction igniting substance covers the whole or nearly the whole of the friction igniting substance and such friction igniting substance is on the end of the stem only the match may be readily lighted by rubbing the head on ordinary objects while the stem is held perpendicular to the object or at such other angle as will bring the friction igniting substance into contact with the object after the protective coating formed by the non-friction igniting substance is sufficiently worn off; but as the friction igniting substance does not extend along the side of the stem the match will not be ignited by friction on its sides, and so accidental ignition by tramping upon it or by friction of the heads on each other while in the box will be obviated.

While I have shown and described a specific form of my invention, I desire it to be understood that my invention is not limited to the precise construction shown and described, but that it admits of considerable modification.

What I claim is—

1. A match comprising a stem, a friction igniting substance on the end thereof and within the extended periphery thereof, and a non-friction igniting substance covering the friction igniting substance.

2. A match comprising a stem, a friction igniting substance on the end thereof substantially within the end edges of the stem, and a non-friction igniting substance covering the friction igniting substance.

3. A match comprising a stem, a friction igniting substance on the end thereof and within the extended periphery thereof, and a non-friction igniting substance covering the friction igniting substance and overlapping the edges of the stem.

In testimony whereof I have signed my name to this specification, in the presence of two subscribing witnesses, this 20th day of February, 1903.

JOSEPH E. STATE.

Witnesses:
  HENRY A. HAMILTON,
  J. B. MEGOWN.